United States Patent
Fujimoto et al.

(10) Patent No.: US 6,936,089 B2
(45) Date of Patent: Aug. 30, 2005

(54) MOLTEN ALUMINUM ALLOY PROCESSING METHOD AND FLUX FOR MOLTEN ALUMINUM ALLOY PROCESSING

(75) Inventors: Hideo Fujimoto, Moka (JP); Kazuharu Masada, Kobe (JP); Toshiko Ogawa, Tokyo (JP); Tadashi Mantani, Tokyo (JP); Tadao Meguro, Kanuma (JP)

(73) Assignee: Kabushiki Kaisha Kobe Seiko Sho (Kobe Steel, Ltd.), Kobe (JP)

( * ) Notice: Subject to any disclaimer, the term of this patent is extended or adjusted under 35 U.S.C. 154(b) by 188 days.

(21) Appl. No.: 10/263,842

(22) Filed: Oct. 4, 2002

(65) Prior Publication Data

US 2004/0065172 A1 Apr. 8, 2004

(51) Int. Cl.[7] ................................. C22C 1/06
(52) U.S. Cl. .......................... 75/687; 75/309
(58) Field of Search ................... 75/687, 309

(56) References Cited

U.S. PATENT DOCUMENTS

| | | | |
|---|---|---|---|
| 382,198 A | * 5/1888 | Seymour | .................... 420/478 |
| 4,788,037 A | 11/1988 | Kaifu et al. | |
| 4,908,184 A | 3/1990 | Kaifu et al. | |
| 5,011,547 A | 4/1991 | Fujimoto et al. | |
| 5,066,323 A | * 11/1991 | Mulder | ......................... 75/305 |
| 5,389,453 A | 2/1995 | Toyose et al. | |
| 5,965,230 A | 10/1999 | Sugita et al. | |
| 6,171,362 B1 | 1/2001 | Osumi et al. | |

FOREIGN PATENT DOCUMENTS

| | | |
|---|---|---|
| DE | 690 07 806 | 7/1994 |
| DE | 695 02 198 | 8/1998 |
| JP | 59-47337 | 3/1984 |
| JP | 7-207376 | 8/1995 |
| JP | 11-80851 | 3/1999 |
| JP | 2000-256873 | 9/2000 |

OTHER PUBLICATIONS

Patent Abstracts of Japan. JP 51–147419, Dec. 17, 2003.

* cited by examiner

*Primary Examiner*—Melvyn Andrews
(74) *Attorney, Agent, or Firm*—Oblon, Spivak, McClelland, Maier & Neustadt, P.C.

(57) ABSTRACT

A molten aluminum alloy processing method is intended use sludge produced by the zinc phosphate treatment of structures including those of aluminum alloys effectively as a flux for molten aluminum alloy processing. The flux contains 3 to 30% by mass fluorine-equivalent metal fluorides, 40 to 90% by mass metal phosphates (8 to 18% by mass P) and 50% by mass or below inorganic salts. The sum of contents of the inorganic salts and metal phosphates is 90% by mass or below.

6 Claims, No Drawings

MOLTEN ALUMINUM ALLOY PROCESSING METHOD AND FLUX FOR MOLTEN ALUMINUM ALLOY PROCESSING

BACKGROUND OF THE INVENTION

1. Field of the Invention

The present invention relates to a method of processing molten aluminum and molten aluminum alloys (hereinafter referred to inclusively as "molten aluminum alloy(s)"), effectively using sludge from an aluminum alloy structure processing process using zinc phosphate, and a flux to be used by the method.

2. Description of the Related Art

Recycling of aluminum alloys have become prevalent in recent years in view of resource conservation and cost reduction. Since different alloys have different additive element contents, respectively, aluminum alloys are recycled in secondary aluminum alloys and foundry aluminum alloys having compositions which are easy to adjust.

Recovered scraps are melted in a molten metal by a melting process, the molten metal is refined by a refining process, slag is removed from the refined molten metal by a slagging-off process, and the refined molten metal is subjected to casting to provide secondary alloys or cast alloys. The melting process through the slagging-off process will be described. Materials, i.e., scraps, put in a melting furnace are heated and melted to produce a molten metal. Organic substances adhering to the materials, and oxides produced by the melting process form various inclusions in the molten metal. The inclusions and metals are mixed to form slag by the agency of a refiner, and the slag floats. The slag is a principal cause of defects in products and hence must be removed. However, since the slag contains metals in a high metal content, metal loss occurs if the slag containing metals is removed. Therefore, the metals contained in the slag must be returned to the molten metal as much as possible and only the inclusions must be efficiently removed by the slagging-off process.

A representative slagging-off process sprays a halogen flux over the surface of the molten metal such that the halogen flux and the slag are mixed. The halogen flux reacts with fine aluminum particles contained in the slag. This reaction generates reaction heat, the reaction heat heats the slag to enhance the fluidity of the metals contained in the slag so that the metals are returned to the molten metal. A generally known degassing process blows a flux together with an inert gas, such as nitrogen gas or argon gas, into the molten metal.

The degassing process and the slagging-off process are very important molten metal processing processes to clean the molten metal and to improve the quality of products. Slag disposal agents for removing slag from a molten aluminum alloy are proposed in, for example, JP-A Nos. 207376/1995 and 80851/1999.

The automobile industry uses a large amount of aluminum alloys for forming various members in view of weight reduction. Most automotive bodies, in particular, are formed from steel panels and aluminum alloy panels. Generally, those panels are subjected to a zinc phosphate treatment for surface preparation before coating. Since the steel panels and the aluminum alloy panels are subjected simultaneously to the zinc phosphate treatment, the aluminum ion concentration of a processing liquid employed in the zinc phosphate treatment increases gradually, and the processing ability of the processing liquid to process the steel panels deteriorates. To prevent such deterioration of the processing ability, a generally known method adds fluorine ions in the processing liquid to precipitate aluminum ions. Although this method enhances the ability of the zinc phosphate treatment, a large amount of sludge containing precipitated aluminum fluoride as a principal component is produced. This sludge has a high fluorine content and is difficult to use. Therefore, the sludge is disposed of as waste by landfilling.

Efforts have been made for the improvement of aluminum alloys to suppress the increase of sludge. For example, a method of suppressing the increase of sludge proposed in JP-A No. 256873/2000 forms a film over the surface of aluminum alloy member to control the elution of aluminum ions. A method that uses a fluoride is used prevalently owing to its cost effect and efficiency.

A special trader collects the sludge periodically and disposes of the sludge as industrial waste by landfilling or the like. Increase in the amount of aluminum alloys used not only increases waste disposal cost, but also entails a serious environmental problem of difficulty in finding places for waste disposal.

The inventors of the present invention made earnest studies to solve the foregoing problems. The inventors analyzed the composition of sludge produced by the zinc phosphate treatment of structures of steel and aluminum alloys and found that the sludge contains a large amount of components of cryolite (Na, Al, F). The respective contents of those components of cryolite are dependent on the fluoride concentration of a zinc phosphate treatment bath and the amount of processed aluminum alloy.

When an aluminum alloy is melted, a molten metal processing flux is used to eliminate hydrogen that forms pores when the molten aluminum alloy solidifies and to clean the molten aluminum alloy by eliminating nonmetallic inclusions that cause internal defects.

The inventors noticed that general fluxes for molten metal processing contains Na. The inventors made studies of using cryolite as a flux and found the use of sludge as a flux for molten aluminum alloy processing.

SUMMARY OF THE INVENTION

The present invention has been made in view of the foregoing circumstances and it is therefore an object of the present invention to maintain a clean global environment by recycling sludge to use finite resources effectively and to reduce waste disposal cost.

The present invention provides a method of effectively recycling sludge produced by the zinc phosphate treatment of structures including those of aluminum alloys as a flux for molten aluminum alloy processing.

According to a first aspect of the present invention, a molten aluminum alloy processing method includes the steps of: melting scraps including those of aluminum alloys into a molten metal; and removing slag produced by a refining process of refining the molten metal by using a flux as a slag disposal agent; wherein the flux contains sludge produced by adding fluorine ions to a processing liquid used for the zinc phosphate treatment of structural members including those of aluminum alloys.

According to a second aspect of the present invention, a molten aluminum alloy processing method includes the steps of: melting scraps including those of aluminum alloys into a molten metal; and removing slag produced by a refining process of refining the molten metal by using a flux as a slag disposal agent; wherein the flux is manufactured by using sludge produced by adding fluorine ions to a processing liquid used for the zinc phosphate treatment of structural members including those of aluminum alloys as a raw material.

According to a third aspect of the present invention, a flux to be used by a molten aluminum alloy processing method contains: 3 to 30% by mass fluorine-equivalent metal fluorides; 40 to 90% by mass metal phosphates (8 to 18% by mass P); and 50% by mass or below inorganic salts excluding metal fluorides and metal phosphate; wherein the sum of contents of inorganic salts other than metal fluorides is 90% by mass or below.

According to a fourth aspect of the present invention, a slag disposal agent to be used by a molten aluminum alloy processing method contains: 3 to 30% by mass fluorine-equivalent metal fluorides; 40 to 90% by mass metal phosphates (8 to 18% by mass P) and 50% by mass or below inorganic salts excluding metal fluorides and metal phosphates; wherein the sum of contents of the inorganic salts other than metal fluorides is 90% by mass or below.

DESCRIPTION OF THE PREFERRED EMBODIMENTS

The inventors of the present invention analyzed the composition of sludge produced in a zinc phosphate bath for the effective utilization of the sludge, and acquired a knowledge that the sludge contains, in high contents, elements corresponding to the component elements of cryolite ($Na_3AlF_6$), a principal component of a slag disposal agent for removing slag in a molten aluminum alloy. Various experiments were conducted to examine the practical applicability of the sludge as a raw material of a flux.

Test pieces respectively having different area ratio between a steel and an aluminum alloy were subjected to a phosphate treatment using a bath containing 400 ppm free fluorine to produce different kinds of sludge respectively having different cryolite ratios. The different kinds of sludge were dehydrated to obtain dehydrated sludge as slag disposal agents for a molten metal. Table 1 shows the respective compositions of the different kinds of dehydrated sludge. When analyzing the composition of each kind of sludge, the sludge was dried at 105° C. for 2 hr, 0.5 g of the dried sludge was sampled, the sample dried sludge was dissolved in 30 cm³ of hot concentrated hydrochloric acid. The hydrochloric acid solution of the sample dried sludge was diluted so as to be 100 cm³ of the solution to obtain a test sample. The contents of the metallic components were measured by an atomic absorption method and those of other components were measured by ion chromatography.

TABLE 1

Composition of sludge (Percentage by weight)

| Elements | Sludge A | Sludge B | Sludge C | Remarks |
|---|---|---|---|---|
| O | 9.0 | 16.0 | 19.0 | Principally |
| P | 17.0 | 31.2 | 38.0 | phosphates |
| Fe | 9.0 | 14.0 | 17.6 | and oxides |
| Zn | 3.6 | 7.8 | 10.5 | |
| Unavoidable elements | 7.1 | 6.1 | 6.6 | |
| Na | 19.0 | 9.5 | 3.6 | Principally |
| Al | 7.0 | 2.4 | 0.9 | fluorides |
| F | 27.9 | 13.0 | 3.8 | |

The slagging-off characteristics of the sludge were examined. The Fe, Zn and Na contents of the molten metal after the addition of the sludge to the molten metal were measured to evaluate the contamination of the molten metal by impurity metals contained in the sludge on the basis of the Fe, Zn and Na contents of the molten metal. Measured values are shown in Table 2. As obvious from Table 2, the contamination of the molten metal by the impurity metals was negligibly slight.

A general flux does not contain Fe or Zn. The experimental results above show that Fe and Zn contained in a flux according to the present invention do not cause a contamination problem of the molten metal. A general flux does not contain metal phosphates, either, since they are impurities for the general flux.

TABLE 2

Contaminants in molten metal

| | Fe (%) | Zn (%) | Na (ppm) |
|---|---|---|---|
| Not processed | 0.0037 | 0.0012 | 0.00 |
| Sludge A | 0.0052 | 0.0011 | 0.0067 |
| Sludge B | 0.0065 | 0.0014 | 1.33 |
| Sludge C | 0.0079 | 0.0018 | 4.09 |

Note:
5 kg of 99.99%-pure aluminum was melted, and processed using 20 g of sludge A method of obtaining sludge as a raw material of a flux for molten aluminum alloy processing will be described.

Sludge is recovered from a zinc phosphate bath by continuous gravity filtration, pressure cloth filtration or pressure vapor filtration. The recovered sludge is dried by air drying, hot air drying (80 to 150° C.) or drum-disk conduction heating (80 to 150° C.). The dried sludge is classified by rotation-vibration screening, gravity-inertial classification or centrifugal classification.

It is effective to use the foregoing sludge as a flux for processing a molten aluminum alloy in combination with a general flux. The mixing ratio between the sludge and the general flux is selectively determined according to the type of the molten metal, desired degassing degree and desired slagging-off degree.

The flux for molten aluminum alloy processing is used by a method that sprays sludge powder of an adjusted grain size over the surface of the molten metal, a method that forces the flux into the molten metal, a method that blows the flux together with an inert gas, such as nitrogen gas, into the molten metal or a method that forces solid flux of an adjusted shape and size into the molten metal. Preferably, a proper method is selectively determined according to the type and capacity of a furnace, and desired degree of molten metal processing.

Similar sludge, as a flux for a molten aluminum alloy processing, can be obtained from structures including those of steels, such as cold-rolled steel plates, those of aluminum, those of aluminum alloys, those of aluminum alloys plated with Zn, those of Zn, Zn—plated steel plates, Zn—Fe— plated steel plates, Zn—Ni—plated steel plates and the like.

Preferred embodiments of the present invention will be described hereinafter.

First Embodiment

Structures including cold-rolled steel plates and those of aluminum alloys were subjected to a zinc phosphate treatment, and sludge was recovered. The sludge was dried by a hot-air dryer, and the dried sludge was classified by a centrifugal classifier. The classified sludge was mixed with a commercial flux (Flux-A, Fountec Co.) for processing molten aluminum and molten aluminum alloys to obtain a mixed flux containing 20% sludge. The commercial flux and the mixed flux were introduced into molten aluminum under the following conditions to examine the contaminating effect of the sludge on the molten aluminum.

Ground metal: 99.99% Aluminum
Test Conditions:
    Weight of molten aluminum: 5 kg
    Temperature of molten aluminum: 740° C.
    Weight of added flux: 5 g, 10 g, 20 g
    Method of flux addition: Immersion of flux wrapped in a high-purity aluminum foil

TABLE 3

| Flux | Fe (wt %) | | Zn (wt %) | | Na (ppm) | |
|---|---|---|---|---|---|---|
| | No flux | 20% flux | No flux | 20% flux | No flux | 20% flux |
| 5 g | 0.0052 | 0.0050 | 0.0011 | 0.0019 | 0.067 | 0.00 |
| 10 g | 0.0065 | 0.0064 | 0.0011 | 0.0021 | 1.33 | 1.44 |
| 20 g | 0.0079 | 0.0080 | 0.0014 | 0.0020 | 4.09 | 3.67 |

Table 3 shows the measured compositions of test ingots obtained by casting aluminum alloys treated by using the flux and the mixed flux. The compositions of the test ingots treated by using the mixed flux containing the sludge are similar to those of the test ingots treated by using the flux not containing any sludge. There was no difference in quality between the test ingots treated by using the mixed flux containing the sludge, and those treated by using the flux not containing any sludge.

Metal fluorides contained in the sludge (sludge disposal agent) of the present invention undergoes an exothermic reaction with sludge floating on the surface of a molten metal and facilitates the separation of the sludge from the molten metal. Such metal fluorides include, for example, LiF, NaF, KF, SrF, $CaF_2$, $MgF_2$, $AlF_3$, $NaAlF_4$, $Na_3AlF_6$, $KAlF_4$, and $K_3AlF_6$. A halide, particularly, a chloride, such as NaCl, KCl, SrCl, $CaCl_2$, $BaCl_2$, $AlCl_3$ or the like, may be added to the molten metal to control reaction rate and fluidity.

Inorganic salts and metal phosphates serve as firework fuels that make the flux generate heat during molten metal processing. Possible inorganic salts are, for example, metal carbonates, such as $Na_2CO_8$, $K_2CO_3$ and $MgCO_3$, metal sulfates, such as $Na_2SO_4$, $K_2SO_4$ and $MgSO_4$, and metal nitrates, such as $NaNO_3$, $KNO_3$ and $Ca(NO_3)_2$. Possible metal phosphates are, for example, $FePO_4$. $Zn_3(PO)_2$, $Mn_3(PO)_{21}$, $Ni_3(PO)_2$ and such.

Inorganic salts and metal phosphates are effective in controlling exothermic reaction rate, and the allowable limit of total content of inorganic salts and metal phosphates in connection with molten metal processing temperature is 90%. An inorganic oxide is used as a control agent for properly controlling the reaction of the composition during molten metal processing or an extender. Possible inorganic oxides are, for example, MgO, $SiO_2$ and $Al_2O_3$, A carbonaceous substance, similarly to the inorganic salt, may be optionally used as a firework fuel. Possible carbonaceous substances include coke and pulverized coal.

Preferably, the aforesaid powder slag disposal agent is sprayed over the surface of the molten metal. The powder slag disposal agent is filled in a small bag. The solid slag disposal agent is formed in a proper shape and a proper size by compression forming.

Second Embodiment

Alloys were melted in a practical 15 ton melting furnace and the different kinds of sludge respectively having the compositions shown in Table 1 were mixed in the molten alloys. Slag separating property and quality of slag were examined. Results of examination are shown in Table 4. About 1 kg of the dried powder sludge was packed in a bag, and the packed sludge was placed on the surface of a molten alloy in the melting furnace.

TABLE 4

Results of tests of ability of sludge as slag disposal agent

| Slag disposal agent | Quality and melting temperature of the alloy | Slag separating characteristic | Bad odor and smoke | Property of slag | Metal loss |
|---|---|---|---|---|---|
| Not used | AC4C 720° C. | No heat generation | None | Good | 2.3% |
| Sludge A | AC4C 700° C. | Good | Slight and acceptable | Good | 1.2% |
| Sludge A | ADC12 670° C. | Good | Slight and acceptable | Good | 1.0% |
| Sludge A | AC4C 680° C. | Good | Slight and acceptable | Good | 1.3% |
| Commercial slag disposal agent | ADC12 670° C. | Good | None | Good | 1.2% |

As obvious from Table 4, the sludge used as fluxes do not affect the quality of the aluminum alloys.

The sludge produced by the zinc phosphate processing of structures including those of aluminum alloys, which has been disposed of as industrial waste, can be effectively used as a flux for processing molten aluminum alloys. Such utilization of the sludge contributes to maintaining a clean global environment, effectively using finite resources and reducing waste disposal cost.

Thus, the present invention utilizes the sludge produced by the zinc phosphate processing of aluminum alloys as a slag disposal agent for removing slag from a molten metal. The slag removing ability of the sludge is comparable to that of the conventional fluxes and is sufficiently practically effective Thus, the recycling of the sludge, which has been rarely effectively used, can be achieved.

The foregoing invention has been described in terms of preferred embodiments. However, those skilled, in the art will recognize that many variations of such embodiments exist. Such variations are intended to be within the scope of the present invention and the appended claims.

What is claimed is:

1. A molten aluminum alloy processing method, comprising the steps of:
    preparing a flux as a disposal agent for slag that is produced in the refining of molten aluminum metal by combining a conventional flux for aluminum refining with a dried sludge produced by adding fluorine ions to a processing liquid used for the zinc phosphate treatment of structural members including those of aluminum or aluminum alloys, the dried sludge thereby comprising Na, Al, F, Zn, Fe, P and O;
    melting aluminum scrap into a molten aluminum metal;
    adding said flux to said molten aluminum metal which removes slag that is formed as the aluminum metal is refined; and
    separating said slag material that is formed from the molten aluminum metal.

2. The processing method according to claim 1, wherein the flux comprises 3 to 30% by weight fluorine-equivalent metal fluorides, 40 to 90% by weight metal phosphates (8 to 18% by weight P), and 50% by weight or less of inorganic salts excluding metal fluorides and metal phosphate, and wherein the sum of the contents of the inorganic salts other than metal fluorides is no more than 90% by weight.

3. The processing method according to claim 1, wherein the dried sludge is comprised of 3.6 to 19.0% by wt sodium, 7.0 to 0.9% by wt aluminum, 3.8 to 27.9% by wt fluorine, 3.6 to 10.5% by wt zinc, 9.0 to 17.6% by wt iron, 17.0 to 38.0% by wt phosphorus, 9.0 to 19.0% by wt oxygen and the remainder unavoidable elements.

4. The processing method according to claim 1, wherein the flux is added to the molten aluminum metal by spraying powdered sludge onto the surface of molten aluminum, forcing the flux into the molten metal, blowing the flux together with an inert gas into the molten metal or forcing the solid flux into the molten aluminum.

5. The processing method according to claim 1, wherein the dried sludge contains at least one metal fluoride selected from the group consisting of LiF, NaF, KF, SrF, $CaF_2$, $MgF_2$, $AlF_3$, $NaAlF_4$, $Na_3AlF_6$, $KAlF_4$ and $K_3AlF_6$.

6. A molten aluminum alloy processing method, comprising the steps of:

preparing a flux as a disposal agent for slag that is produced in the refining of molten aluminum metal which is a dried sludge produced by adding fluorine ions to a processing liquid used for the zinc phosphate treatment of structural members including those of aluminum or aluminum alloys, the dried sludge thereby comprising Na, Al, F, Zn, Fe, P and O;

melting aluminum scrap into a molten aluminum metal;

adding said flux to said molten aluminum metal which removes slag that is formed as the aluminum metal is refined; and separating said slag material that is formed from the molten aluminum metal.

* * * * *